United States Patent [19]

Rhomberg et al.

[11] Patent Number: 5,015,088

[45] Date of Patent: May 14, 1991

[54] ILLUMINATING APPARATUS FOR PROJECTION PURPOSES

[75] Inventors: Bruno Rhomberg, Hausen; Beat Frick, Buchs, both of Switzerland

[73] Assignee: Gretag Aktiengesellschaft, Regensdorf, Switzerland

[21] Appl. No.: 575,433

[22] Filed: Aug. 30, 1990

[30] Foreign Application Priority Data

Sep. 4, 1989 [CH] Switzerland .......................... 3193/89

[51] Int. Cl.$^5$ ........................ G03B 21/00; G03B 21/20
[52] U.S. Cl. ..................................... 352/198; 362/282; 362/283; 362/297
[58] Field of Search ................ 352/198, 203; 362/282, 362/283, 297

[56] References Cited

U.S. PATENT DOCUMENTS

| | | | |
|---|---|---|---|
| 2,525,598 | 10/1950 | Gruber | 352/198 |
| 3,043,190 | 7/1962 | Mandler | 352/198 |
| 3,590,239 | 6/1971 | Benard | 352/203 |

Primary Examiner—Monroe H. Hayes
Attorney, Agent, or Firm—Burns, Doane, Swecker & Mathis

[57] ABSTRACT

In an illuminating apparatus for projection purposes, in particular a film projector or television image projector by the eidophor system, four condensers are located around a source of light in a cube-shaped housing, the condensers reproducing via the use of deflecting mirrors, an image of the light source on several, spatially adjacent imaging mirror segments, which in turn reproduce the condenser images superimposed upon one another, via an output mirror, on an image aperture of the projection optics.

20 Claims, 5 Drawing Sheets

ILLUMINATING APPARATUS FOR PROJECTION PURPOSES

BACKGROUND OF THE INVENTION

The invention relates to an illuminating apparatus for projection purposes, in particular for a film projector or television image projector by the eidophor process, having an all-around radiating source of light, around which, in a plane intersecting its center of radiation, a plurality of condensers aligned with their optical axes on the light source is located, together with deflecting mirrors associated with the condensers and tilted around an axis extending transversely to the path of light in the plane. In such an apparatus, several images of the source of light may be produced on a secondary light source surface located spaced apart from the plane through the source of light, the apparatus further comprising a plurality of adjacent, imaging optical components, with an optical device being coordinated with the secondary light source, whereby the light of the latter is directed onto the image field and the entrance pupil of a projection optic following in the beam path, the images of the condensers being reproduced in the plane of the image field over each other and rotated relative to each other.

An illuminating apparatus of this type is known from DE-A1 1 547 414 and is equipped with a high light intensity source of light by a xenon gas discharge lamp, which is brightest in the vicinity of its cathode. Around the essentially rod shaped xenon gas discharge light four condensers are located in a square when viewed from the top. Each of the condensers consists of a spherical lens and another lens.

The light exiting from the condensers in four directions at right angles to each other is deflected in each case by a deflecting mirror inward in the direction of the axis of the light source and reaches four field lenses contacting each other in a roof like manner, in which the condenser lenses produce images of the light source. The four images of the inhomogeneously radiating light source form in the field lenses a secondary source of light with a star-shaped luminosity distribution, wherein the brightest parts of the images are as close to the optical axis as possible. The optical axis is located in the vertex of the boundaries between the four field lenses in contact with each other. The known apparatus is therefore adjusted so that the brightest areas of the arc images are located in the vicinity of the fields lens borders, triangular in a top view. As the exact location of the brightest areas is critical, slight local displacements of the arc lead to interfering luminosity fluctuations in the subsequent optical devices.

The field lenses reproduce the condenser lenses in an image aperture provided with an image aperture lens, which produces a pattern of the star-shaped secondary light source in the projection optic. In this manner, an effort is made to have the outer circumference of the star-shaped pattern of the light source images extensively approximate the circular configuration of the entrance pupil of the projection optics, in order to attain good utilization of the pupil. If, however, instead of a square image field and a round pupil an elliptical shape of a pupil is present, which is the case for example when a bar system of a schlieren optical device for an eidophor projector distorts the circular pupil of the projection optic into an ellipse, an especially detrimental loss of intensity is experienced in the known illuminating apparatus.

SUMMARY OF THE INVENTION

It is the object of the invention to create an apparatus of the aforementioned type, characterized by a high luminous efficiency, low sensitivity to local displacements of the luminous arc and good adaptability to different pupil configurations.

This object is attained according to the invention by providing optical components in the secondary light source surface in the form of adjacent segments, which along their edges are crossed relative to each other, and by providing deflecting mirrors that are tilted relative to the plane defined by the optical axes of the condensers around axes again crossed in keeping with the crossing of the associated segments.

Because the deflecting mirrors deflect the incident light not in the direction of the plane defined by the optical axes of the condensers, but in a laterally offset manner, the condensers form a secondary source of light by imaging the light source, which with consideration of the luminosity distribution in the arc and the shape of the entrance pupil of the subsequent optics, is readily optimized relative to its configuration and illumination.

If a short arc xenon lamp is used as the source of light and the pupil of the optical device following the illuminating system is circular in shape, then according to an exemplary embodiment of the invention the adjacent segments comprise spherical mirror elements created by the quartering of a spherical mirror and placed adjacent to each other, arranged in the manner of a propeller or of air vanes. The mirror elements or mirror segments are pointing in the radial direction always in the same direction as the optical axis through the condensers and the associated deflecting mirrors, but the light always arrives through a deflecting mirror at a mirror element that, in the direction of the perpendicular onto the plane defined by the condenser axes, is closer to the adjacent diverting element. Here the images of the light source do not form a star-shaped pattern as in the aforementioned state of the art, but a pattern in the form of a square ring which provides a higher luminous efficiency than the known star-shaped pattern.

Appropriate embodiments and modifications of the invention as a function of the light source used, the image field and the pupil of the subsequent projection optics are also set forth below.

BRIEF DESCRIPTION OF THE DRAWINGS

Other objects and advantages of the present invention will become more apparent from the following detailed description of preferred embodiments as described with reference to the drawings in which.

DETAILED DESCRIPTION OF THE PREFERRED EMBODIMENTS

Figure 1:
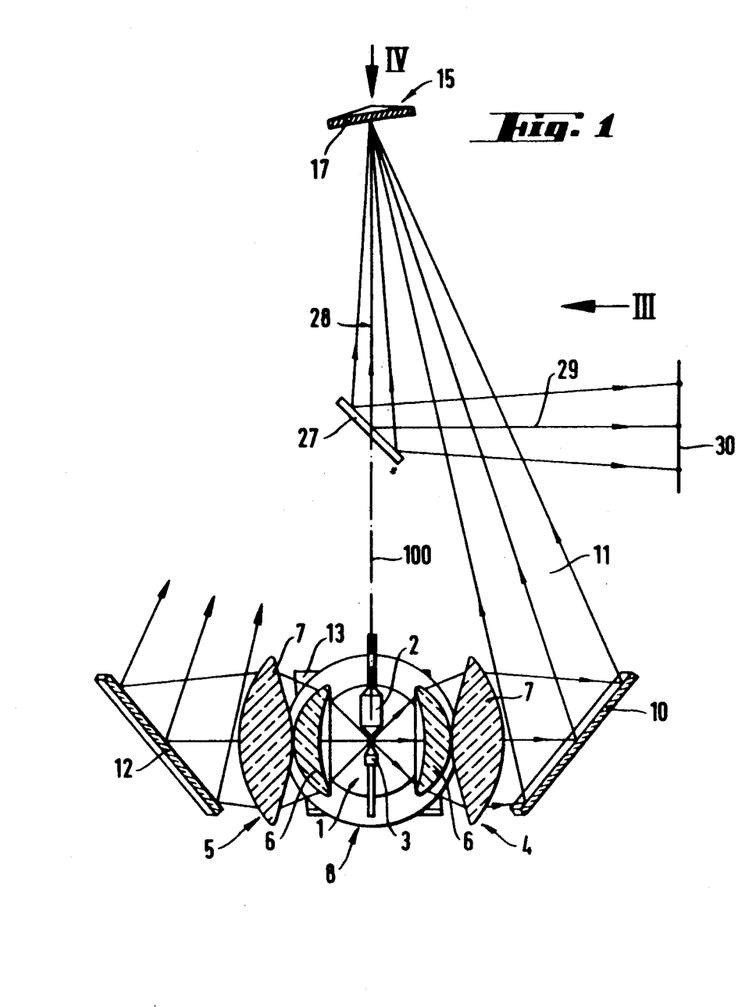
FIG. 1 shows a lateral elevation of the illuminating apparatus in partial sections in three different section planes.

In FIG. 1 an illuminating apparatus for projection purposes is shown, together with its lamp housing. The illuminating apparatus comprises a short arc xenon lamp 1 aligned along a principal axis 100, the light of which is to be collected optimally by the illuminating apparatus so that the greatest possible quantity of light is fed into a limited light channel, the channel being defined relative to its form and magnitude by the image field and the pupil of the projection optic following it, not shown. The subsequent projection optic may consist of an eidophor, film, slide or another light valve projector. Such projectors have an image aperture or image field with a rectangular or in certain cases a square form, which is to be illuminated as homogeneously as possible, with a defined edge decline. The image field may be a slide, a partial image of a field or an electronically produced image, such as is used for example in an eidophor projector. The entrance pupils of the subsequent optical device may be in the form of a circular disk, an elliptical disk or, if mirror optics are used, in the form of a circular or elliptical ring.

In FIG. 1, the short arc xenon lamp 1 used as the light source for the illuminating apparatus is shown without the glass cylinder that is present. The short arc xenon lamp 1 contains inside the glass cylinder, not shown, an anode 2 and a cathode 3. During the operation of such a gas discharge lamp a strongly nonhomogeneous brightness distribution is obtained, with the area of the highest luminosity being located at the cathode 3 and the anode 2 effecting a shadowing, which produces certain asymmetries in the brightness distribution of the image of a condenser exposed to the short arc xenon lamp 1.

In FIG. 1, a first condenser 4 is seen to the right of the short arc xenon lamp 1 and to the left of the lamp 1 a second condenser 5, in a section through a plane extending through the principal axis 100. Each of the condensers 4, 5 may have several lenses and may consist in particular, as shown in FIG. 1, of a meniscus 6 and an aspherical lens 7, the optical axes of which extend at right angles to the principal axis 100 and to the longitudinal axis of the short arc xenon lamp 1, through the arc of the latter.

Figure 2:
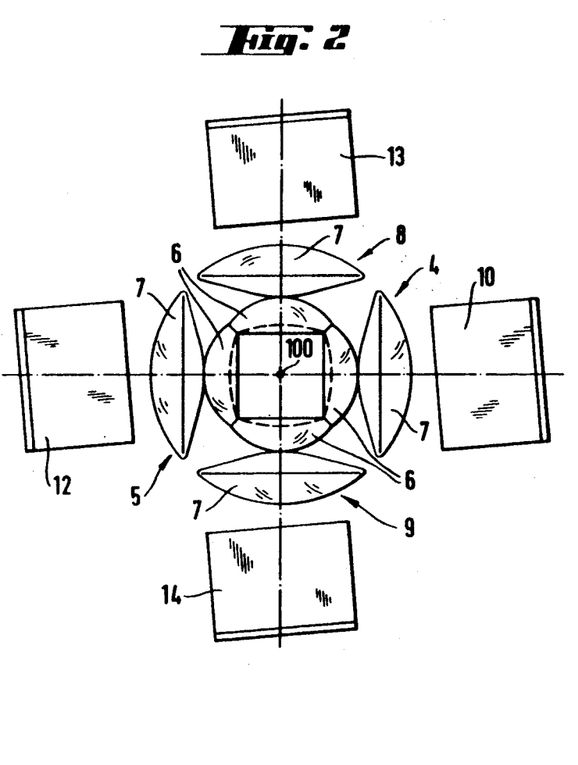
FIG. 2 shows a top view of the condenser layout with the staggered deflecting mirrors of the illuminating apparatus.

As the short arc xenon lamp 1 emits light fluxes not only in the direction of the condensers 4 and 5 shown in section in FIG. 1, but also at right angles to the principal axis 100 in other directions, a third condenser 8 and a fourth condenser 9 are disposed as shown in FIG. 2 in a top view. The four condensers 4, 5, 8 and 9 surround the short arc xenon lamp 1 in the manner of a cube, in the center of which the arc is located and the four lateral surfaces of which are formed by the four condensers, 4, 5, 8 and 9, each of which collects the light radiated in about one-sixth of the entire solid angle, or circumference, about the lamp. The four condensers 4, 5, 8 and 9 are located with optical axes at right angles to each other and to the principal axis 100 and with a narrow air gap in the immediate vicinity of the glass cylinder, not shown, of the short arc xenon lamp 1 and fastened in a cube-shaped housing, from which the necks associated with the anode 2 and the cathode 3 of the glass cylinder project at right angles to the plane of the drawing of FIG. 2.

As seen in FIG. 2, the edges of the meniscus lenses 6 of the four condensers 4, 5, 8 and 9 are in contact with each other along a narrow, arc-shaped surface, such that in a top view of each condenser 4, 5, 8, 9 in the direction of the optical axis or in imaging, a condenser image is obtained, which essentially is square with barrel-shaped edges. The largest square to be inscribed in the square distorted in the shape of a barrel indicates the area of the condenser image utilized by the illumination system.

Figure 3:
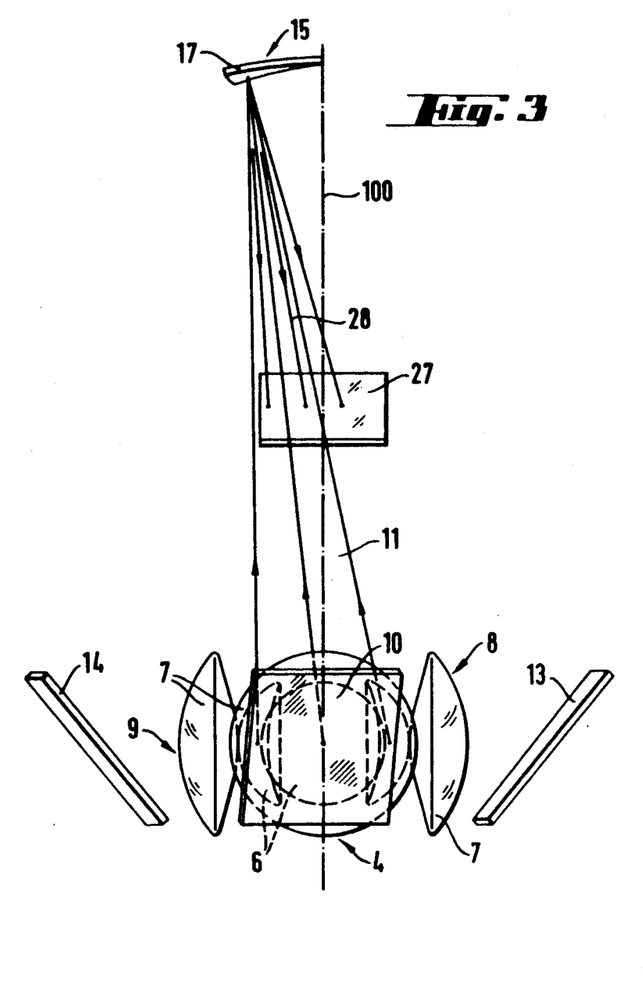
FIG. 3 shows a view of the illuminating apparatus in the direction of the arrows III in FIG. 1 against the direction of the exiting beam of light.

The first condenser 4 is associated with a first flat, adjustable deflecting mirror 10 possibly in the form of a metal oxide vaporized mirror, which is shown in section in FIG. 1, in top view in the direction of the longitudinal axis of the short arc xenon lamp 1 in FIG. 2, and in a rear view in the direction of the optical axis of the first condenser in FIG. 3. The deflecting mirror 10 is mounted in a rectangular adjustable frame, which makes it possible to tilt and adjust the first deflecting mirror 10 around at least two axes.

The first deflecting mirror 10 is located in the vicinity of the condenser 4 obliquely to the optical axis of the latter. In FIG. 1 the first deflecting mirror 10 is shown in section. It is aligned relative to the optical axis of the first condenser 10 in a manner such that the beam of light exiting from the condenser 4 along the sectioning plane through the condensers 4, 5, 8, 9 is deflected by the first deflecting mirror 10 not only in the direction of the principal axis 100, but also forward, out of the sectional plane.

The beam path drawn in FIG. 1 therefore extends from the short arc xenon lamp 1 to the first deflecting mirror 10 in the plane of the drawing and also out of the plane of the drawing, which in FIG. 1 extends through the longitudinal axes of the condensers 4 and 5 and the principal axis 100.

The first deflecting mirror 10 is therefore tilted not only around an axis at right angles to the plane of the drawing, but also around a second axis within the plane of the drawing, which in FIG. 2 is shown in exaggerated manner to visualize the staggering thereby obtained. FIG. 3 illustrates how the beam of light 11 reflected by the first deflecting mirror 10 exits laterally, to the left in FIG. 3 from the plane defined by the longitudinal axis of the short arc xenon lamp 1, i.e. the principal axis 100, and the optical axis of the first condenser 4.

On the side of the short arc xenon lamp 1 opposite the first deflecting mirror 10, a second deflecting mirror 12 is located, which deflects the beam of light leaving the second condenser 5 in FIG. 1 upwards and to the rear, or behind, the plane of the drawing. The necessary orientation of the second deflecting mirror 12, which again is adjustable, is shown in FIG. 2 in a slightly exaggerated manner.

FIG. 2 further shows a third adjustable deflecting mirror 13 and a fourth adjustable deflecting mirror 14, which are associated with the third condenser 8 and a fourth condenser 9, respectively. These mirrors, are shown in a lateral section in FIG. 3.

The optical axes of the condensers 4, 5, 8 and 9 are located on a plane which extends at right angles to the principal axis 100 and thus to the longitudinal axis of the short arc xenon lamp 1, and which extends between the anode 2 and the cathode 3. At a distance at which the condensers 4, 5, 8 and 9 produce an image of the arc of the short arc xenon lamp 1 enlarged by a factor of about 10, a collector plate 15 is provided above the plane defined by the optical axes of the condensers 4, 5, 8, 9, coaxially with the longitudinal axis through the short arc xenon lamp 1. In a top view in the direction of the arrow IV in FIG. 1 the collector plate 15 has the shape shown in FIG. 4 with a circular external outline. The collector plate 15 thus extends transversely to the perpendicular onto the plane defined by the optical axes of the condensers 4, 5, 8 and 9. The collector plate 15 consists of a spherical mirror, preferably a metal oxide vaporized mirror, which is divided along the partitions 16 seen in FIG. 4 into a first segment 17, a second segment 18, a third segment 19 and a fourth segment 20. The segments 17, 18, 19, 20 thus form quarter segments or spherical imaging mirror segments.

Figure 4:
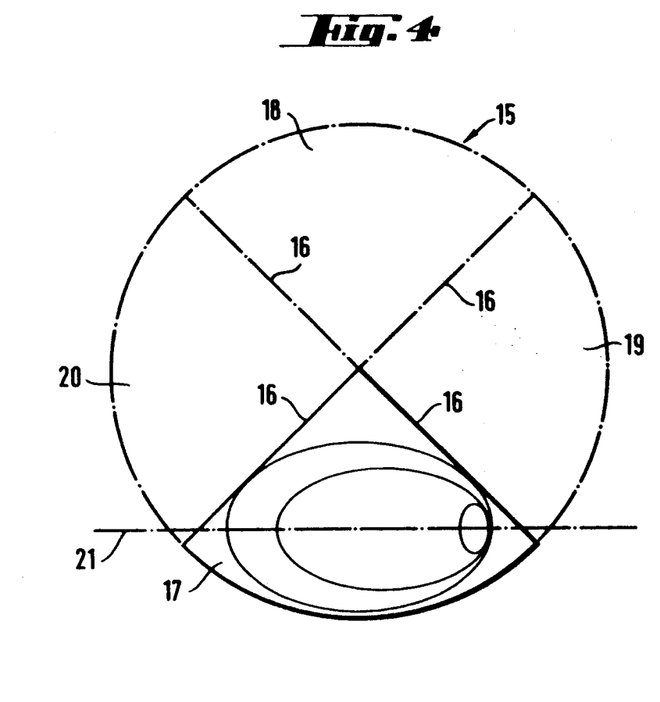
FIG. 4 is a schematic representation of a top view of the mirror elements of the illuminating apparatus in the direction of the arrow IV in FIG. 1.

The segments 17, 18, 19, 20 are mounted in a square frame, not shown, which makes it possible to rotate or tilt the segments 17, 18, 19, 20 around two axes located at right angles to each other and the principal axis 100, in the plane of the frame.

In FIG. 4, in the first segment 17 of the collector plate 15, the image of the arc of the lamp 1 produced by the first condenser 4 is represented schematically by equiluminence lines, wherein the image of the arc extends along a secant of the circular outline of the collector plate 15 and the brightest area of the arc image is located in the vicinity of the partition 16 between the first segment 17 and the third segment 19.

In FIG. 1 the first segment 17 of the collector plate 15, upon which a first arc image of the short arc xenon lamp 1 is reproduced by the first condenser 4, is shown by itself and in section. The section plane of segment 17 is slightly offset forward relative to the section plane through the condensers 4, 5, when viewed along the section line 21 shown in FIG. 4. In FIG. 3, the front elevation of the first segment 17 is seen along the partition 16 to the third segment 19, in the absence of the other segments 18, 19, 20, to illustrate via FIGS. 1 and 3, how the first segment 17 is tilted around two axes extending at right angles to the principal axis 100, so that the four segments 17, 18, 19, 20 are arranged in the shape of a propeller or of air vanes, with mutual staggering of the individual vanes. By the rotation of the segments 17, 18, 19, 20 around a first rotating axle along a line bisecting their angle and along a second axis extending at right angles to the line bisecting their angle, the twist of the beam path produced by the staggered deflecting mirrors 10, 12, 13, 14 is compensated so that finally the light of all four beam paths arriving from different directions, are combined in the image field.

The first deflecting mirror 10 in the beam path of the first condenser 4 is oriented in a manner such that the image of the arc is imaged on the first segment 17 pointing in the direction of the fourth deflecting mirror 14 and not on the third segment 19 pointing in the direction of the first deflecting mirror 10. In this manner the image of the arc shown in FIG. 4, bottom, extends along the intersection 21 or a secant of the collector plate 15 and not along a radius of the collector plate 15. The segments 17 to 20 are preferably oriented so that the projections of the lines bisecting their angles onto the plane defined by the optical axes of the condensers 4, 5, 8, 9 point in the same directions as the optical axes of the condensers 4, 5, 8, 9.

Figure 5:
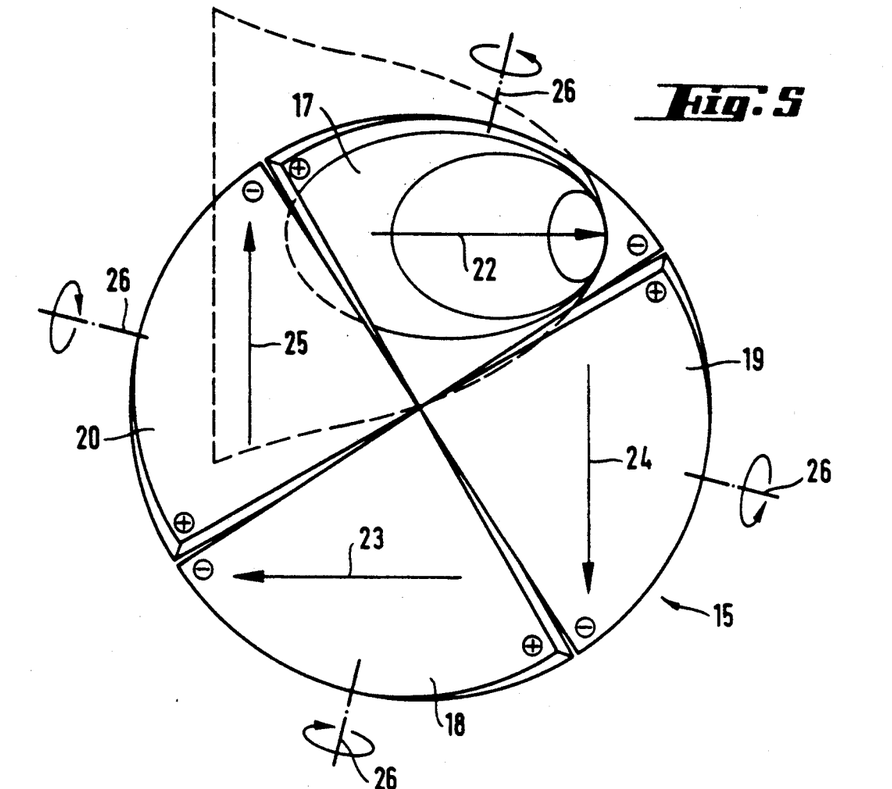
FIG. 5 shows a view enlarged relative to FIG. 4 of the mirror elements against the direction of the arrow IV in FIG. 1.

FIG. 5 shows the collector plate 15 with its segments 17 to 20 in an enlarged view from below, i.e. against the direction of the arrow IV in FIG. 1. The arc image produced by the first condenser 4 on the first segment 17 is also shown in FIG. 5, top, by its equiluminence lines, with the equiluminence lines located outside the segment 17 being indicated by broken lines. To symbolize the arc image, an arc image arrow 22 is shown together with the image of the arc, the arrow tip of which indicates the brightest area of the arc image. The direction of the arrow gives the orientation of the image of the arc.

The beam of light reflected by the second deflecting mirror 12 arrives at the second segment 18, not shown in FIG. 1 but shown in FIGS. 4 and 5, of the collector plate 15. Due to the orientation of the second deflecting mirror 12, the second arc image extends along the arc image arrow 23 on the second segment 18 located opposite the first segment 17, with a parallel but opposing orientation.

In a manner similar to the production of arc images on the segments 17 and 18 by the condensers 4 and 5, on the segments 19 and 20 arc images are created by the condensers 8 and 9, which are symbolically shown in FIG. 5 by a third arc arrow 24 and a fourth arc arrow 25.

It is seen in FIG. 5, that the arc images are located along a rectangular ring. By orienting the arc images along secants instead of the line bisecting the angles of the segments 17 to 20, the quantity of the light that may be collected and thus passed on by the collector plate 15 is larger than if the brightest areas would always be located in the vicinity of the center of the collector plate 15 and the arc images oriented according to the bisecting lines of the segments 17 to 20. The aforedescribed twisted beam path around the principal axis 100 and the perpendicular through the longitudinal axis of the short arc xenon lamp 1 onto the plane formed by the optical axis of the condensers 4, 5, 8, 9 thus makes it possible for the condensers 4, 5, 8, 9 to reproduce the arc of the lamp 1 via the deflecting mirrors 10, 12, 13, 14 on the associated segments 17, 18, 19, 20 of the collector plate 15 in a manner such that the brightest components of the arc to the greatest extent possible, are located on the corresponding segment 17, 18, 19, 20, thereby maximizing the total quantity of light impacting a given surface.

The segments 17 to 20 are imaging mirrors, which make it possible to reproduce the condenser images of the condensers 4, 5, 8, 9 so that they are rotated relative to each other by 90° and are superimposed upon each other, if the segments 17 to 20 laid out in the manner of a propeller, and which are adjusted so that the light arriving from different directions from the deflecting mirrors 10, 12, 13, 14 are deflected into a single common image field. In FIG. 5, the adjusting axes 26 are shown along the lines bisecting the angles of the segments 17, 18, 19, 20, together with the rotating arrows, which indicate how the individual segments 17, 18, 19, 20 must be tilted so that the condenser images produced by the segments 17, 18, 19, 20 are imaged in the field of vision over each other, and so that the arcs represent four secondary light sources adjacent to each other in the entrance pupil of the subsequent optical device.

In addition to the rotation around the adjusting axes 26, a slight tilting of the segments 17, 18, 19, 20 around axes at right angles to the adjusting axes 26 is also required. Without the necessary staggering of the segments 17 to 20, the segments together would form the surface of a concave mirror. In order to visualize the deviations relative to such a concave mirror due to the rotating motion around the adjusting axis 26, in FIG. 5 plus signs are entered in the locations in which the segments 17, 18, 19, 20 are rotated out of the plane of the drawing. Correspondingly, the minus signs indicate locations in which the segment surfaces are located below a continuous spherical mirror surface.

As seen in FIGS. 1 and 3, the light reflected by the segments 17, 18, 19, 20 of the arc images acting as secondary light sources arrives at a common output mirror 27. The output mirror 27 deflects the light incident from the segments 17, 18, 19, 20 of the collector plate 15 out at right angles to the principal axis 100 in the direction of the subsequent light channel. As seen in FIGS. 1 and 3, the center ray of the beam 28 extends, beginning at the segment 17, at a distance from the principal axis 100 and approaches the axis as a function of its approach to the output mirror 27, which in FIG. 1 is represented by a section plane located between the section plane through the deflecting mirrors 10, 12 and the section plane through the first segment 17. Following its reflection from the output mirror 27, the center beam 29 coming from the mirror 27 further approaches the plane defined by the principal axis 100 and the optical axes of the condensers 4 and 5, until it reaches the image aperture 30 shown schematically in FIG. 1., where the square condenser images produced by the segments 17, 18, 19, 20 and distorted in the shape of a barrel, are reproduced. At the location of the image aperture 30 of the described illumination apparatus, for example, a field lens and a lantern slide may be provided, which are illuminated by the four condenser images rotated by 90°, with high luminous intensity and homogeneity. Via an objective lens, not shown, the lantern slide can then be projected, whereby the images of the secondary light sources on the collector plate 15 are reproduced by the field lens within the circular entrance pupil or entrance aperture of the projection optics.

Figure 6:
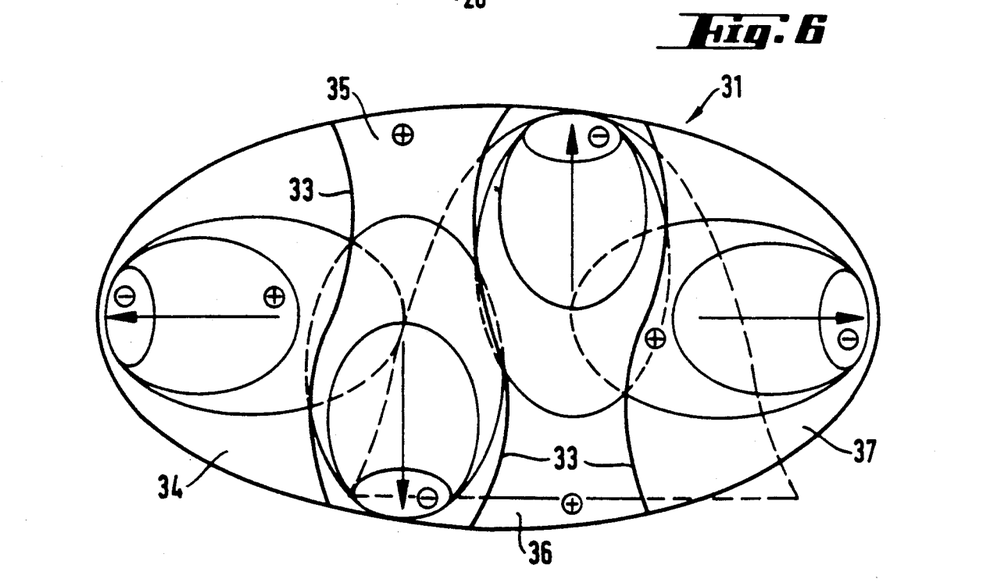
FIG. 6 is a schematic representation of a top view in the direction of the beam onto an elliptical layout mirror element layout with an axis ration of 1.85.
Figure 7:
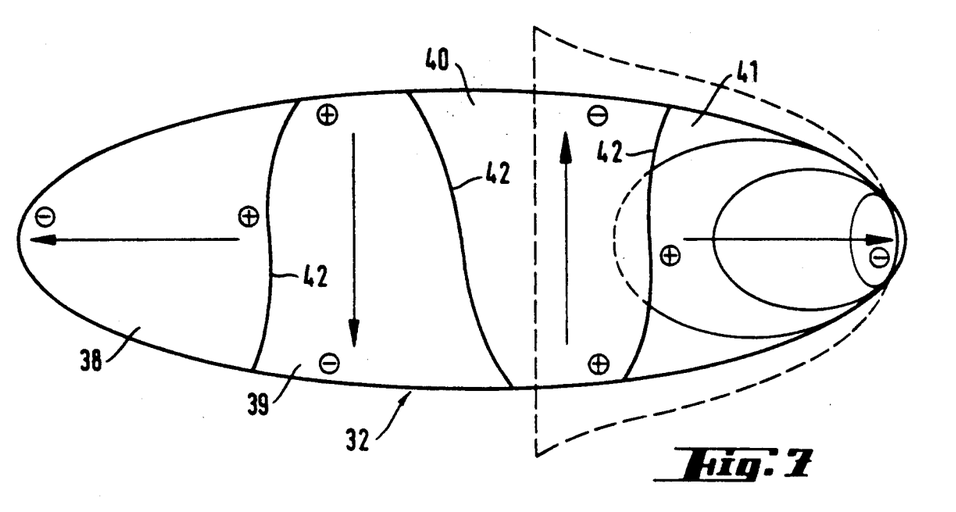
FIG. 7 shows a view corresponding to FIG. 6 for an axis ratio of about 3.

If the image field is not square but rectangular and the form of the pupil of the subsequent optic is not circular but elliptical, it is convenient for high luminous efficiency to use, instead of a circularly bordered collector plate 15, an elliptically bordered collector plate 31 according to FIG. 6 or an elliptically bordered collector plate 32 according to FIG. 7. It should be noted for an optimal illuminating device that certain optical elements severely alter the pupil shape of an optical projection device. Thus, for example, a bar system used in the schlieren optic of the eidophor system deforms the circular pupil of the projection optics into an ellipse with a axis ratio of 2.5:1.

If a rectangular image aperture 30 is to be illuminated, it is advantageous to employ an anamorphotic optical illuminating device, which converts the square condenser images into rectangular condenser images with the desired lateral ratio and the correct size. An anamorphotic illuminating device distorts the subsequent circular pupil in a rear view. This pupil image controls the outer contour of the collector plates 31 and 32. The anamorphotic illuminating optics may be provided in the beam path between the output mirror 27 and the image aperture 30 as a separate optical system. However, it is also possible to integrate the first cylinder lens of an anamorphotic device into the collector plate and the second cylinder lens into the output mirror 27, instead of placing all of the components between the output mirror 27 and the image aperture 30.

The elliptical collector plate 31 shown in a top view in FIG. 6 has an axis ratio of 1.85. This ratio corresponds to one of the standards for 35 mm cinematographic film. The partitions 33 between the segments 34, 35, 36, 37 extend not along straight lines as in the case of the circular collector plate 15, but along curves. The position of the partitions 33 is chosen so that the overall luminous efficiency will be maximized and the desired pupil shape maintained. The form of the partitions 33 in FIG. 6 was determined by drawing the four arc images, in the manner shown in FIG. 6, with their equiluminence lines and subsequently connecting the intersections of the equiluminence lines to produce the partitions 33. This procedure yields the segments seen in FIG. 6, which are staggered in the manner indicated by the plus and minus signs and which again are spherical mirror elements. The position of the arc images is represented by arrows in a manner similar to FIG. 5. In the case of the orientation and position of the arc images shown in FIG. 6 an optimal total luminous efficiency is obtained, distributed over the elliptical collector surface.

If an elliptical collector surface with an axis ratio of about 3 is required, which may occur for example in the case of a television projection system, it is necessary to further divide the arc images in the direction of the principal axis of the ellipse. Such a layout may be seen in FIG. 7 wherein the partitions 42 again represent the connecting lines between intersections of equiluminence of the different arc images with the orientations and positions indicated. It is obvious to those skilled in the art that by an appropriate enlargement of the arc images and their orientation and layout on an elliptical surface, it is possible to determine optimal partitions 33 or 42, so that the maximum quantity of light is collected in a given light channel. In the case of the collector plates 15, 31 and 32 the unsymmetrical distribution of the arc image of a short arc xenon lamp 1 has been taken into consideration.

Figure 8:
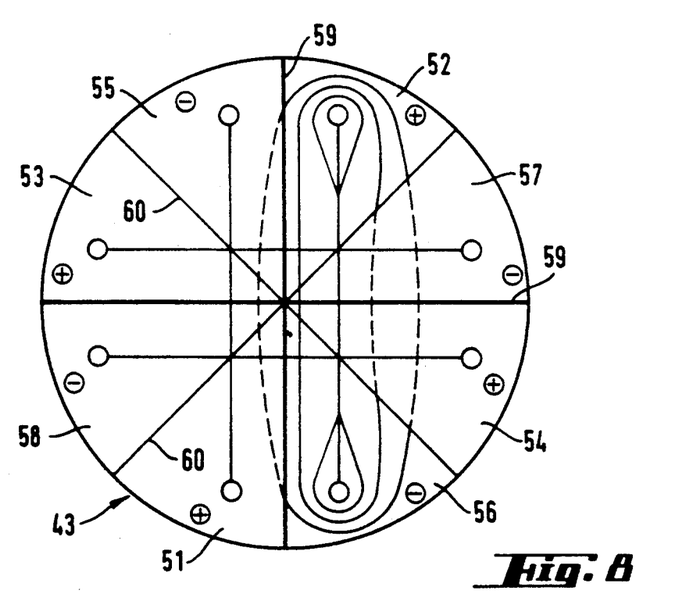
FIG. 8 shows a top view of a circular mirror element layout with the reproduction of the arcs of a halogen metal vapor lamp.

If in place of a short arc xenon lamp a halogen metal vapor lamp with an arc image having two gravity centers is to be used, an especially high luminous efficiency is obtained, if with a round shape of the pupil a collector plate 43 laid out and illuminated according to FIG. 8 is used. The collector plate 43 consists, as do the aforedescribed circular and elliptical collector plates, of imaging segments 51 to 58. In contrast to the segments 17 to 20 of the collector plate 15, these are formed by dividing a spherical mirror into eight parts. The straight partition lines between the segments 51 to 58 form a principal cross 59 and a secondary cross 60, rotated by 45° relative to the principal cross 59. As seen in FIG. 8, the arc images are located in pairs along an axis of the principal cross laterally offset relative to each other. The arc image represented in FIG. 8 by its equiluminence lines is imaged by a third condenser 8 over the third deflecting mirror 13 onto the segments 52 and 56. The minus sign in the segment 56 indicates that this segment is below the plane of the drawing and the plus sign in the segment 52 indicates that the latter is tilted out of the plane, in order to obtain the subsequent unification of the beam. The arc image produced by the first condenser 4 extends over the segments 53 and 57, the arc image produced by the second condenser 5 extends over the segments 54 and 58 and the arc image produced by the fourth condenser 9 extends over the segments 51 and 55. With the orientation, position and size of the arc images, maximum luminous efficiency is obtained for a round pupil.

Figure 9:
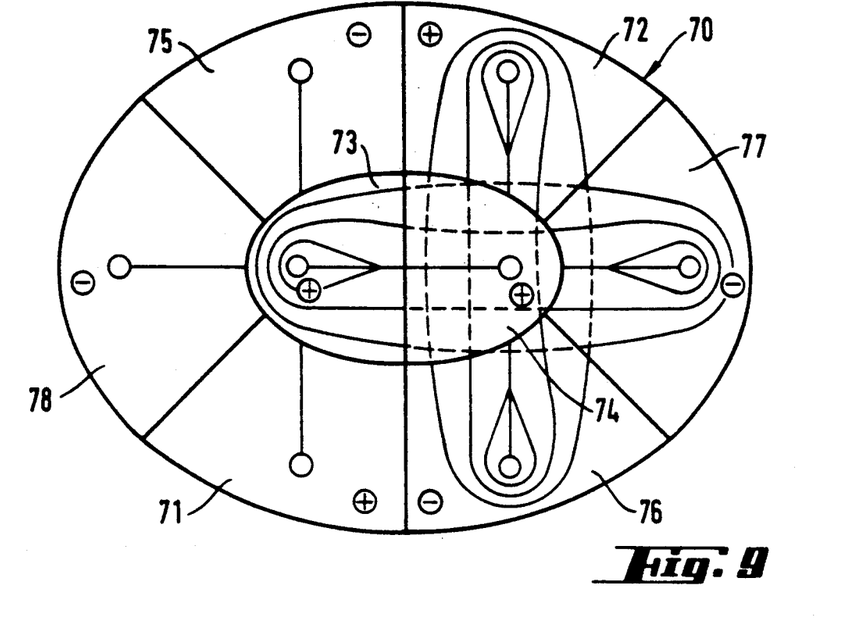
FIG. 9 shows a top view of a mirror element layout for an illuminating apparatus with a halogen metal vapor lamp and an axis ratio of 1.33 for the elliptical mirror element layout; and, FIG. 10 is a schematic top view of an elliptical mirror element layout for an illuminating apparatus with a halogen metal vapor lamp and an axis ratio of 1.78 for a subsequent mirror optic with central shielding.

FIG. 9 shows the configuration and illumination of an elliptical collector plate or a halogen metal vapor lamp with an axis ratio of 1.33, such as that used for example in slide projectors. As seen in FIG. 9, the distribution of the light over the collector plate 70 is obtained by adjusting the deflecting mirrors 10, 12, 13, 14 to provide two arc images located laterally offset relative to the secondary axis and two arc images longitudinally offset relative to the principal axis of the ellipse. The segments 71 to 78 have the configuration shown in FIG. 9 and the mutual staggering indicated in FIG. 9 by plus signs and minus signs. The equiluminence lines of the arc images associated on the one hand with the segments 72 and 76 and the segments 73 and 77, are also shown in FIG. 9. The orientation of the deflecting mirrors 10, 12, 13, 14 is such that the first deflecting mirror 10 is aligned onto the segments 73 and 77, the second deflecting mirror 12 onto the segments 74 and 78, the third deflecting mirror 13 onto the segments 72 and 76 and the fourth deflecting mirror 14 onto the segments 71 and 75. This yields the superposition of the arc images shown in FIG. 9.

Figure 10:
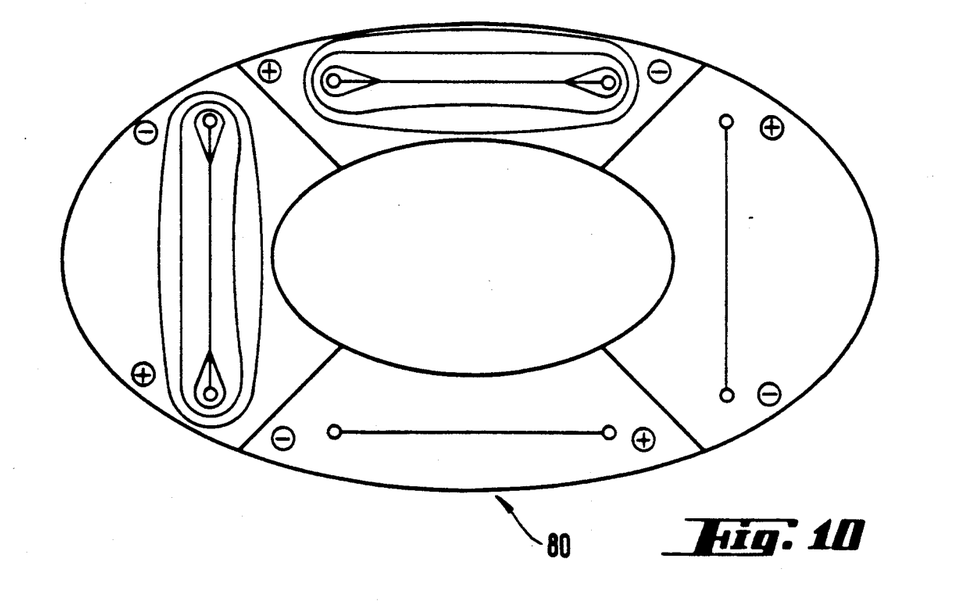

If the subsequent projection optic is a mirror optic with center shadowing, the center part of the ellipse must be eliminated. In FIG. 10, for such a case, an elliptical collector plate 80 is provided with an axis ratio of 1.78. The orientation of the individual segments of the collector plate 80 is indicated by the plus and minus signs given. The position of the arc images is represented for two arc images by the associated equiluminence lines and for two further arc images corresponding to FIGS. 8 and 9 by circles, which symbolize the brightest areas of the arc images and are connected with each other by straight lines. As seen in FIG. 10, the individual arc images, similar to the collector plate 15, are formed along a ring, whereby the deflecting mirrors 10, 12, 13, 14, similarly to the collector plate 15, irradiate not the segment located directly above the deflecting mirror involved, but the segment next in the direction of the ring.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Illuminating apparatus for projection purposes, in particular for a film projector or television image projector by the eidophor process, comprising:
a source of light which radiates in all directions;
a plurality of condensers located around said light source in a plane intersecting a center of radiation of said light source, said condensers being aligned with their optical axes on the light source;
deflecting mirrors associated with said condensers and tilted around an axis extending transversely to a path of light in said plane, and tilted relative to the plane defined by the optical axes of the condensers, and staggered relative to each other;
a secondary light source surface for receiving images of the light source from said deflecting mirrors, said secondary light source being located spaced apart from the plane through the source of light and further comprising a plurality of adjacent, imaging optical components formed as adjacent segments which are staggered relative to each other along their borders in correspondence with the staggering of the deflecting mirrors; and,
an optical device coordinated with said secondary light source surface and having an entrance pupil which receives images of the condensers from said staggered adjacent segments, the received images being superimposed on each other and being rotated relative to each other, and which reproduces said superimposed images on an image field.

2. Illuminating apparatus according to claim 1, wherein the segments consist of lenses.

3. Illuminating apparatus according to claim 1, wherein the segments consist of mirror segments.

4. Illuminating apparatus according to claim 3, wherein the segments are metal oxide vaporized mirrors.

5. Illuminating apparatus according to claim 4, wherein said deflecting mirrors are metal oxide vaporized mirrors.

6. Illuminating apparatus according to claim 5, wherein the segments have glass carriers formed as infra-red collector lenses.

7. Illuminating apparatus according to claim 1, wherein the adjacent segments have a common external contour with a shape adapted to the entrance pupil of said optical device.

8. Illuminating apparatus according to claim 1, wherein an output mirror is disposed between the secondary light source surface and the image field, and is aligned transversely to the path of said light, to direct said superimposed images from the secondary light source surface to the optical device for reproduction on an image field.

9. Illuminating apparatus according to claim 1, wherein the light source is a short arc lamp and the secondary light source surface further comprises spherical imaging mirror elements, each corresponding to a quarter segment of a spherical mirror, staggered relative to each other like a propeller and slightly inclined relative to the spherical mirror axis, and wherein four condensers and four deflecting mirrors are provided, said deflecting mirrors disposed so that four similar nonhomogeneous light source images are reproduced on the spherical imaging mirror elements along a closed ring relative to the deflecting mirrors, each image being offset along said ring by a spherical imaging mirror element, and wherein the spherical imaging mirror elements reproduce four superimposed condenser images rotated by 90° in the image field.

10. Illuminating apparatus according to claim 1, wherein the light source is a halogen metal vapor lamp and the secondary light source surface further comprises imaging spherical mirror elements, each corresponding to a one-eighth segment of a spherical mirror, with partition lines between the spherical mirror segments forming a principal cross aligned with four of said deflecting mirrors and a secondary cross rotated by 45° relative to said principal cross, and wherein said four deflecting mirrors are disposed so that four light source images are extended along and laterally offset relative to a continuous arm of the principal cross, and wherein the spherical mirror segments are unilaterally bordered by a continuous arm of the principal cross and arranged in pairs and staggered such that four condenser images produced by the mirror elements are superimposed upon each other in the image field.

11. Illuminating apparatus according to claim 1, wherein the light source is a short arc lamp with four condensers and an anamorphotic illuminating optical device is disposed in a path of the light source to convert a square condenser image into a rectangle, and wherein the secondary light source surface has an external contour formed as an ellipse and divided along curved lines into said adjacent segments.

12. Illuminating apparatus according to claim 11, wherein four deflecting mirrors are disposed to reproduce in a center of the ellipse two light source images offset in a longitudinal direction relative to the principal axis of the ellipse, and to reproduce in an area at each end of the principal axis a light source image along the principal axis whose brightest area points outward from the center of the ellipse.

13. Illuminating apparatus according to claim 11, wherein the curving lines separating the adjacent segments extend along the intersections of lines of equal luminosity of adjacent light source images.

14. Illuminating apparatus according to claim 1, wherein the light source is a halogen metal vapor lamp with four associated condensers wherein an anamorphotic illuminating optical device is disposed in a path of the superimposed images to convert a square condenser image into a rectangle, and wherein the secondary light source surface has an external contour formed as an ellipse and divided along straight lines and a concentric inner ellipse into segments.

15. Illuminating apparatus according to claim 14, wherein four deflecting mirrors are disposed such that two light source images are laterally offset relative to a secondary axis of the ellipse and two light source images are offset in a longitudinal direction on a principal axis of the ellipse.

16. Illuminating apparatus according to claim 15, wherein the four deflecting mirrors are disposed such that the four condenser images are reproduced on the secondary light source surface along an elliptical ring.

17. Illuminating apparatus according to claim 1 wherein the light source is a short arc lamp.

18. Illuminating apparatus according to claim 17 wherein four condensers and four deflecting mirrors are provided.

19. Illuminating apparatus according to claim 1 wherein the light source is a halogen metal vapor lamp.

20. Illuminating apparatus according to claim 19 wherein four condensers and four deflecting mirrors are provided.

* * * * *